Inventors
Donald J. Greening
Norman L. Peterson
Charles E. Smith
By H R Rather
Attorney March 20, 1962    D. J. GREENING ET AL    3,026,464
MOTOR CONTROL SYSTEMS
Filed April 6, 1959    2 Sheets-Sheet 2

United States Patent Office 3,026,464
Patented Mar. 20, 1962

3,026,464
MOTOR CONTROL SYSTEMS
Donald J. Greening, Thiensville, Norman L. Peterson, Wauwatosa, and Charles E. Smith, Milwaukee, Wis., assignors to Cutler-Hammer, Inc., Milwaukee, Wis., a corporation of Delaware
Filed Apr. 6, 1959, Ser. No. 804,303
10 Claims. (Cl. 318—327)

This invention relates to motor control systems and more particularly to adjustable voltage systems for direct current motors.

While not limited thereto, the invention is especially applicable to direct current motor control with current limit acceleration and deceleration and field weakening control and for automatic regulation of the voltage or speed of the motor.

A general object of the invention is to provide an improved motor control system of the modular type.

A more specific object of the invention is to provide a plurality of component circuits or modules, each having input and output terminals and being readily connectable to one another and to external elements to afford a motor control system.

Another specific object of the invention is to provide component circuits or modules of the semi-conductor controlled type each adapted to be embedded in plastic material and having external terminals for connection in a motor control system.

Another object of the invention is to provide an improved motor control system employing semi-conductor devices.

A further object of the invention is to provide an improved adjustable voltage motor control system of the semiconductor controlled type having current limit acceleration and deceleration, field weakening control and automatic regulation of the field excitation and of the armature voltage or speed of the motor.

Other objects and advantages of the invention will hereinafter appear.

While the apparatus hereinafter described is effectively adapted to fulfill the objects stated, it is to be understood that we do not intend to confine our invention to the particular preferred embodiments of motor control systems disclosed, inasmuch as they are susceptible of various modifications without departing from the scope of the appended claims.

The invention will now be described in detail with reference to the accompanying drawings, wherein:

FIGURES 1A and 1B diagrammatically depict a motor control system constructed in accordance with the invention;

Figure 1B:
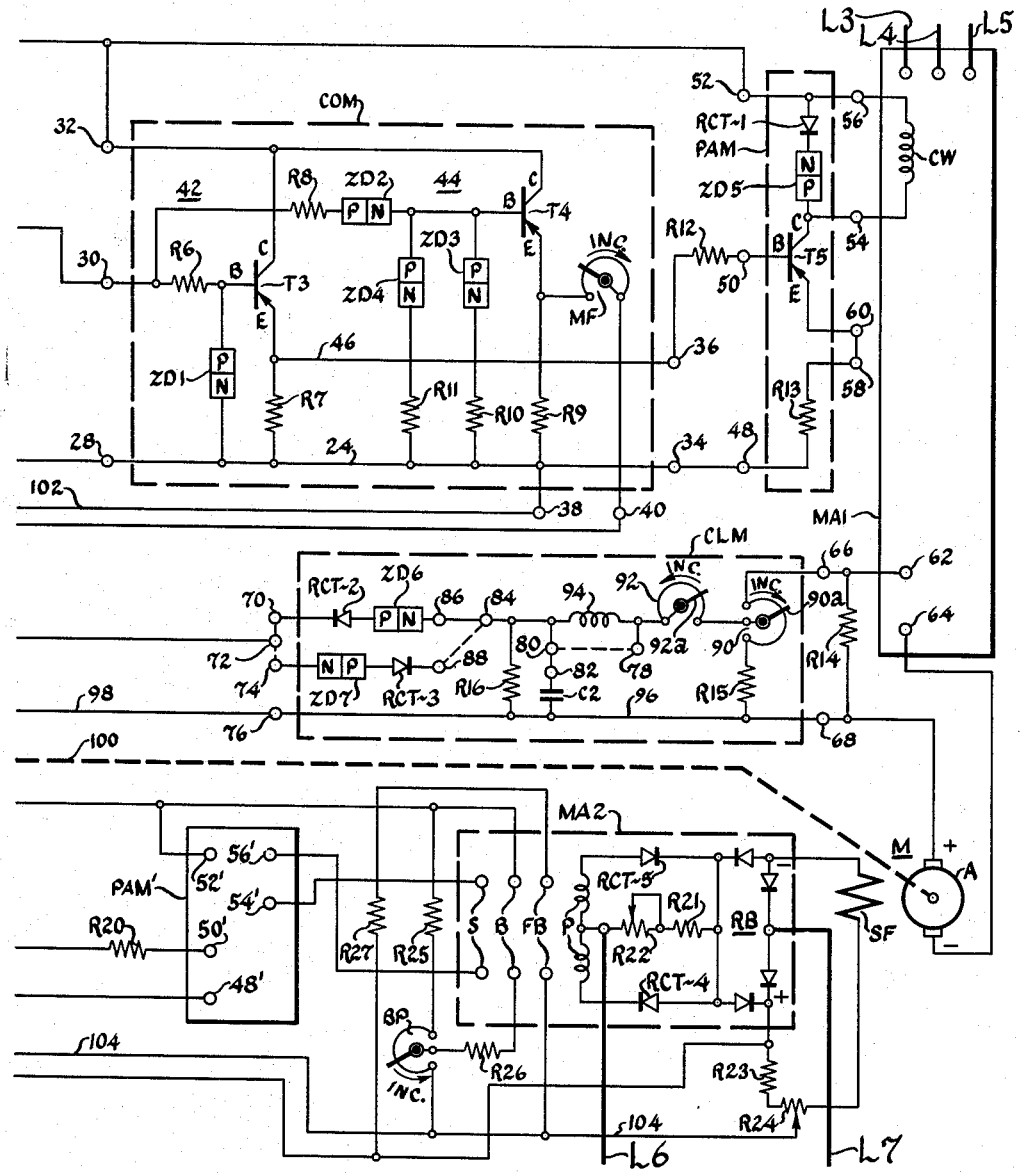
Figure 1A:
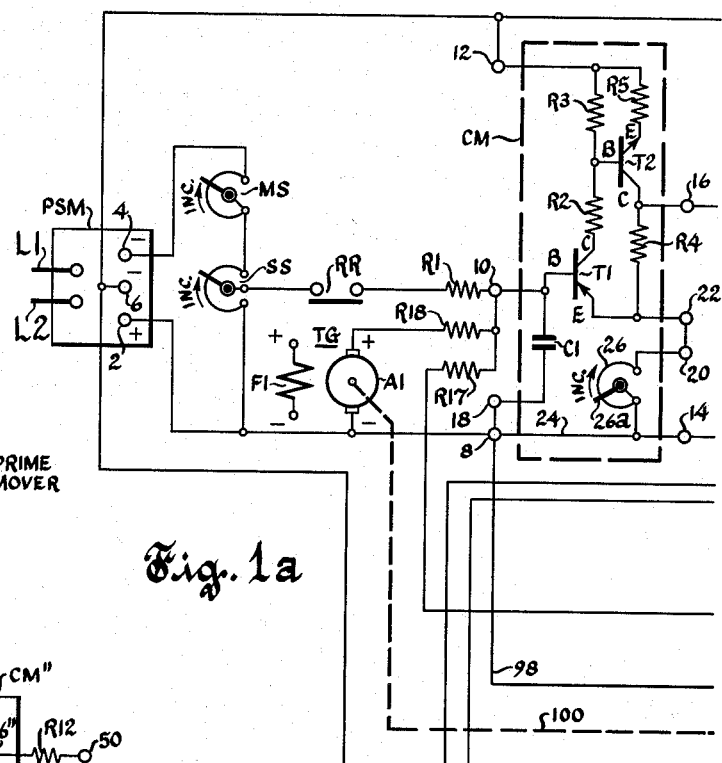

Referring to FIGS. 1A and 1B, there is shown a modular control system for a motor M having an armature A and a shunt field winding SF. Armature A is supplied with adjustable unidirectional voltage from a rectifying magnetic amplifier MA1 and field winding SF is supplied with controllable unidirectional voltage from a rectifying magnetic amplifier MA2 as hereinafter more fully described to control the speed of the motor.

The control system for armature supply magnet amplifier MA1 comprises a power supply module PSM, a comparator CM, a cross-over module COM, a power amplifier module PAM and a current limit module CLM for regulating the armature current. The control system for field supply magnetic amplifier MA2 comprises the aforementioned power supply module PSM, comparator module CM and cross-over module COM and additionally a comparator module CM', a power amplifier module PAM' and a voltage feedback circuit for regulating the field energization. Comparator module CM' and power amplifier module PAM' in the field control circuit are identical to comparator circuit CM and power amplifier circuit PAM, respectively, and therefore have been shown schematically to avoid complicating the drawings.

Power supply module PSM is connected through power supply lines L1 and L2 to a single-phase alternating current power supply source and is provided with a positive output terminal 2 and a pair of negative output terminals 4 and 6 for supplying two predetermined different values of unidirectional current output. Power supply module PSM is of a well known rectifier bridge type and the details thereof have not been shown to avoid complicating the drawings. The rectified output from terminals 2 and 4 is preferably regulated and the rectified output from terminals 2 and 6 may be unregulated.

Comparator circuit CM is provided with external input terminals 8, 10 and 12, external output terminals 14 and 16 and external terminals 18, 20 and 22 for reasons hereinafter described. A speed setter potentiometer SS and a maximum speed rheostat MS are connected in series across terminals 2 and 4, the movable arm of rheostat MS being connected to the junction thereof with potentiometer SS. Direct current terminals 2 and 6 are connected to input terminals 8 and 12, respectively, of comparator module CM. The movable arm of potentiometer SS is connected through normally open contacts RR of a run relay and a resistor R1 to input terminal 10 of comparator module CM.

Comparator circuit CM is provided with a semi-conductor device such as a transistor T1 of the P-N-P conductivity type having an emitter electrode E, a base electrode B and a collector electrode C. Input terminal 10 is connected directly to base electrode B. Input terminal 8 is connected through a common conductor 24, a gain adjusting rheostat 26 and serially jumpered external terminals 20 and 22 to emitter electrode E, movable arm 26a of rheostat 26 being connected to the side thereof which is connected to conductor 24. A filter capacitor C1 is connected between base electrode B and common conductor 24. Terminal 18 is provided between capacitor C1 and terminal 8 to afford disconnection of capacitor C1 by removing the jumper between terminals 8 and 18. Alternatively, additional filter capacitance may be added by connecting a capacitor of desired value in parallel with capacitor C1 between terminals 10 and 18. Collector electrode C of transistor T1 is connected through resistors R2 and R3 and input terminal 12 to negative supply terminal 6 of power supply circuit PSM.

Comparator circuit CM is provided with a second semi-conductor device such as a transistor T2 of the opposite or N-P-N conductivity type having an emitter electrode E, a base electrode B and a collector electrode C. The junction of resistors R2 and R3 is connected directly to base electrode B of transistor T2. The junction of emitter electrode E of transistor T1 and external terminal 22 is connected through a resistor R4 to collector electrode C of transistor T2 and emitter electrode E of the latter is connected through a resistor R5 to input terminal 12. The output from comparator circuit CM is obtained from common conductor 24 at output terminal 14 and output terminal 16 connected to the junction of resistor R4 and collector electrode C of transistor T2. External terminals 20 and 22 which are connected in series between rheostat 26 and the junction of emitter electrode E of transistor T1 and resistor R4 are provided to afford adjustment of the gain and stability of the comparator circuit. Thus, comparator gain may be decreased and stability increased by disconnecting the jumper between terminals 20 and 22 and adding the desired value of resistance between these terminals. Comparator gain may be increased and stability decreased by turning movable arm 26a of rheostat 26 clockwise in the direction of the arrow to shunt resistance thereof.

Cross-over module COM is provided with external input terminals 28, 30 and 32 and external output terminals 34, 36, 38 and 40. Output terminals 14 and 16 of comparator circuit CM are connected directly to input terminals 28 and 30, respectively, and input terminal 32 is connected directly to negative supply voltage output terminal 6 of power supply circuit PSM.

Cross-over circuit COM is provided with an armature reference voltage output portion 42 and a field reference voltage output portion 44. Motor armature reference voltage output portion 42 is provided with a semiconductor device such as a transistor T3 of the P-N-P conductivity type or the like having an emitter electrode E, a base electrode B and a collector electrode C. Control voltage input terminal 30 is connected through a resistor R6 to base electrode B. Common reference potential input terminal 28 is connected through common conductor 24 and a resistor R7 to emitter electrode E and supply voltage input terminal 32 is connected directly to collector electrode C of transistor T3. Common conductor 24 is connected through a semi-conductor device such as a Zener diode ZD1 of the P-N conductivity type or the like to base electrode B of transistor T3. Emitter electrode E is connected through a conductor 46 to output terminal 36 and the other output terminal 34 for this portion of the cross-over circuit is connected directly to common conductor 24. Thus, the motor armature reference voltage output is obtained across resistor R7 which is connected in series with emitter electrode E of transistor T3.

Motor field reference voltage output portion 44 of the cross-over circuit is provided with a semi-conductor device T4 of the P-N-P conductivity type of the like having an emitter electrode E, a base electrode B and a collector electrode C. Input terminal 30 is connected through a resistor R8 and a semi-conductor device such as a Zener diode ZD2 (similar to diode ZD1) to base electrode B. Input terminal 28 is connected through common conductor 24 and a resistor R9 to emitter electrode E and collector electrode C is connected directly to supply voltage input terminal 32. Common conductor 24 is connected through a resistor R10 and a semi-conductor device such as Zener diode ZD3 of the P-N conductivity type or the like in series to base electrode B of transistor T4. A resistor R11 and a Zener diode ZD4 are connected in parallel with resistor R10 and diode ZD3. Diodes ZD3 and ZD4 are similar to diodes ZD1 and ZD2 except that they differ therefrom and from one another in their voltage response characteristics as hereinafter more fully described in connection with the description of operation of the system. Emitter electrode E of transistor T4 is connected through a minimum motor field adjusting rheostat MF to output terminal 40, the movable arm of rheostat MF being connected to the side thereof which is also connected to terminal 40. The other output terminal 38 for this portion of the cross-over circuit is connected to common conductor 24. Thus, the motor field reference voltage output is obtained across resistor R9 which is connected in series with emitter electrode E of transistor T4. As hereinafter more fully described, motor field energization is supplied from magnetic amplifier MA2 and the reference voltage obtained from cross-over circuit portion 44 is employed to control amplifier MA2 to weaken the motor field. Therefore, movement of the movable arm of rheostat MF clockwise in the direction of the arrow increases the minimum motor field energization by adding resistance to decrease the amount of field weakening that can be effected by adjustment of the reference voltage.

Power amplifier module PAM is provided with external input terminals 48, 50 and 52, external output terminals 54 and 56 and external terminals 58 and 60 for reasons hereinafter described. Output terminal 34 of cross-over circuit COM is connected through common conductor 24 directly to input terminal 48. Output terminal 36 of cross-over circuit COM is connected through a resistor R12 to input terminal 50 of power amplifier circuit PAM and input terminal 52 of the latter is directly connected to negative direct current supply terminal 6 of power supply module PSM.

Power amplifier circuit PAM is provided with a semiconductor device such as a transistor T5 of the P-N-P conductivity type or the like having an emitter electrode E, a base electrode B and a collector electrode C. Input terminal 50 is connected directly to base electrode B, input terminal 48 is connected through a resistor R13 and serially jumpered terminals 58 and 60 to emitter electrode E of transistor T5 and collector electrode C of the latter is connected directly to output terminal 54. Input terminal 52 is connected directly to output terminal 56. A semi-conductor device such as a Zener diode ZD5 of the P-N conductivity type or the like and a blocking, protective half-wave rectifier RCT-1 are connected in series across output terminals 54 and 56. The output from power amplifier circuit PAM is obtained across output terminals 54 and 56 and applied across control winding CW of magnetic amplifier MA1. External terminals 58 and 60 are provided to afford adjustment of the maximum output current of the power amplifier. To this end, the jumper between terminals 58 and 60 may be disconnected and the desired value of resistance connected in place thereof.

Magnetic amplifier MA1 is of a known construction and the details thereof have not been shown to avoid complicating the drawings. Magnetic amplifier MA1 is preferably supplied from a three-phase alternating current power supply source through power supply lines L3, L4 and L5. The rectified output of magnetic amplifier MA1 is applied from output terminals 62 and 64 across a current limit signal resistor R14 in series with armature A of the motor.

Current limit circuit CLM is provided with external input terminals 66 and 68, external output terminals 70, 72, 74 and 76 and external terminals 78, 80, 82, 84, 86 and 88 for reasons hereinafter described. The junction of positive output terminal 62 of magnetic amplifier MA1 and resistor R14 is connected to input terminal 66 and the junction of resistor R14 and armature A is connected to input terminal 68 of current limit circuit CLM. A current limit adjusting potentiometer 90 and a resistor R15 are connected in series across input terminals 66 and 68. Movable arm 90a of potentiometer 90 is connected through a rheostat 92, a filter choke coil 94, terminals 84 and 86, a semi-conductor device such as a Zener diode ZD6 of the P-N conductivity type or the like and a half-wave rectifier RCT-2 to output terminal 70. Input terminal 68 is connected directly through a conductor 96 to output terminal 76 and then through a conductor 98 to common conductor 24 at input terminal 8 of comparator circuit CM. A filter capacitor C2 is connected between conductor 96 and terminal 82, the latter being connected through terminal 80 to the junction of coil 94 and terminal 84. A resistor R16 is connected between conductor 96 and the junction of coil 94 and terminal 84.

As hereinafter more fully described, output terminal 70 is an accelerating current limit output terminal and output terminal 74 is a decelerating current limit output terminal. Terminal 72 is connected through a resistor R17 to input terminal 10 of comparator circuit CM and may be conncted either to terminal 70 as shown by the solid line or to terminal 74 as shown by the broken line. Terminal 74 is connected through a semi-conductor device such as a Zener diode ZD7 of the P-N conductivity type or the like and a half-wave rectifier RCT–3 to external terminal 88. External terminal 84 may be connected to terminal 86 as shown by the solid line, these terminals being in series between coils 94 and diode ZD6. Alternatively, terminal 84 may be connected to terminal 88 as shown by the broken line to provide deceleration current limit. In the latter case, terminal 72 would also be disconnected from terminal 70 and connected to terminal 74.

External terminals 78 and 80 are connected to respective ends of choke coil 94 and external terminal 82 is connected between terminal 80 and capacitor C2. When the motor armature current contains large alternating current components such as, for example, those produced by static generators, the filter comprising coil 94 and capacitor C2 is connected in the circuit as shown. When the motor armature current is free of such alternating current components, the filter may be removed by disconnecting the jumper between terminals 80 and 82 to disconnect one side of capacitor C2 and connecting a jumper between terminals 78 and 80 as shown by the broken line thereby to shunt coil 94 effectively out of the circuit.

The system is provided with a speed regulator comprising a tachometer generator TG having an armature A1 and a field winding F1. The positive side of armature A1 is connected through a resistor R18 to input terminal 10 of comparator circuit CM and the negative side of armature A1 is connected to common conductor 24. Field winding F1 may be energized from a suitable source of constant direct current as shown by the positive and negative symbols. Armature A of motor M is connected through a shaft 100 to drive armature A1 of the tachometer generator. With these connections a voltage which is a predetermined function of the speed of motor M is compared with the reference voltage in comparator circuit CM to regulate the speed of the motor as hereinafter more fully described.

Comparator module CM' is similar to circuit CM and the relevant terminals thereof have been given corresponding reference numerals distinguished by a prime. Output terminal 40 of motor field reference voltage output portion 44 of cross-over circuit COM is connected through a resistor R19 to input terminal 10' of comparator circuit CM'. The other output terminal 38 of this portion of the cross-over circuit is connected through common conductor 102 to input terminal 8', and input terminal 12' is connected directly to negative supply voltage terminal 6 of power supply module PSM. Output terminal 16' is connected through an external resistor R20 to input terminal 50' of power amplifier module PAM'. It will be apparent that power amplifier module PAM' is similar to circuit PAM and the relevant terminals thereof have been given corresponding reference numerals distinguished by a prime. Output terminal 14' of comparator module CM' is connected directly to input terminal 48' of power amplifier module PAM' and input terminal 52' of the latter is connected directly to negative supply voltage terminal 6 of power supply module PSM.

Magnetic amplifier MA2 is provided with a serially-connected pair each of power windings P, feedback windings FB, bias windings B and control signal windings S. Power windings P are supplied from an alternating current power supply source through power supply lines L6 and L7 and a full-wave rectifier bridge RB. To this end, line L6 is connected to the junction at the first ends of power windings P and line L7 is connected to one input terminal of rectifier bridge RB. The other input terminal of the rectifier bridge is connected to the power windings in three paths, one path extending from such other input terminal through a self-saturating half-wave rectifier RCT–4 to the other end of the lower power winding, another path extending from such other input terminal through a resistor R21 and an adjustable resistor R22 to the junction of the power windings and a third path extending from the other end of the upper power winding through a self-saturating half-wave rectifier RCT–5 to such other input terminal of rectifier bridge RB. The positive output terminal of rectifier bridge RB is connected through resistors R23 and R24 and motor shunt field winding SF to the negative output terminal of the rectifier bridge.

A supply circuit for bias windings B extends from positive common conductor 24 through terminal 38, conductors 102 and 104, the resistor of bias adjusting potentiometer BP and a resistor R25 to negative supply terminal 6 of power supply module PSM. The movable arm of potentiometer BP is connected through a resistor R26 and bias windings B in series to negative supply terminal 6. The positive output terminal of rectifier bridge RB is connected through a resistor R27, feedback windings FB and conductor 104 is series to an adjustable center tap on resistor R24. Control signal windings S are connected in series across output terminals 54' and 56' of power amplifier module PAM'.

A feedback circuit extends from the positive output terminal of rectifier bridge RB through a resistor R28 to input terminal 10' of comparator module CM' and the return path extends from input terminal 8' through conductor 104 to the adjustable center tap on resistor R24.

The operation of the system of FIG. 1 will now be described. Let it be assumed that single phase alternating current power is connected through lines L1 and L2 to power supply circuit PSM and through lines L6 and L7 to field supply magnetic amplifier MA2. Let it also be assumed that three-phase alternating current power is connected through lines L3, L4 and L5 to magnetic amplifier MA1. Magnetic amplifier MA1 will be biased to its "off" condition in a known manner so that an output voltage will not be applied to motor armature A until control winding CW thereof is energized as hereinafter described.

Connection of power to circuit PSM causes a unidirectional current flow from positive output terminal 2 thereof through the resistor of speed setter potentiometer SS and the movable arm and the upper portion of the resistor of maximum speed rheostat MS to negative output terminal 4. Unidirectional current also flows from positive output terminal 2 through common conductor 24, terminal 38, conductors 102 and 104, the resistor of potentiometer BP and resistor R25 to negative output terminal 6 of power supply circuit PSM. A voltage proportional to the voltage drop across resistor R25 and the voltage drop across an adjustable portion of the resistor of potentiometer BP is applied through the movable arm of the latter and resistor R26 across bias windings B of amplifier MA2 to bias the latter to its full "on" condition. As a result, current flows from line L6 through the upper power winding P, rectifier RCT–5 and in parallel with the aforementioned elements through resistors R22 and R21 and then through rectifier bridge RB and the positive output terminal thereof, resistors R23 and R24, field winding SF and rectifier bridge RB to line L7. The circuit for each alternate half-cycle of the alternating current source may be traced from line L7 through rectifier bridge RB, resistors R23 and R24, field winding SF, rectifier bridge RB, rectifier RCT–4 and the lower power winding P and in parallel with the latter two elements through resistors R21 and R22, to line L6. Thus, unidirectional current is supplied to motor shunt field winding SF to afford full field excitation. It will be apparent that current flows in shunt of power windings P through resistors R21 and R22 to afford minimum motor field excitation regardless of whether magnetic amplifier MA2 is biased on. The minimum field excitation may be adjusted by adjusting the movable tap on resistor R22. The voltage drop across resistor R23 and the left-hand portion of resistor R24 is applied through resistor R27 and conductor 104 across feedback windings FB to afford a predetermined amount of negative feedback tending to turn the amplifier a small amount toward its "off" condition. The effect of this feedback is to compensate for line voltage fluctuations and for variations in amplifier output due to resistance changes caused by heating and the like thereby to linearize the amplifier output and to maintain the motor field excitation constant at the preselected value.

To initiate operation of the system, run relay contacts RR are closed to connect the negative voltage from the movable arm of potentiometer SS through resistor R1 to input terminal 10 of comparator circuit CM, the positive side of the input voltage being connected to input terminal 8 of the comparator circuit.

The input voltage to comparator circuit CM is filtered by capacitor C1 and applied across the emitter and base electrodes of transistor T1 to render the latter conducting. As a result, current flows from input terminal 8 through common conductor 24, arm 26a and the upper portion of the resistor of rheostat 26, serially-jumpered terminals 20 and 22, emitter E and collector C of transistor T1, resistors R2 and R3 and terminal 12 to negative terminal 6 of power supply circuit PSM. The voltage drop across resistor R3 is applied through resistor R5 across the emitter and base electrodes of transistor T2 to afford negative emitter bias voltage to render the latter conducting. As a result, current also flows from common conductor 24 through arm 26a and the upper portion of the resistor of rheostat 26, terminals 20 and 22, resistor R4, collector C and emitter E of transistor T2, resistor R5 and terminal 12 to negative terminal 6 of power supply circuit PSM.

Transistors T1 and T2 are of opposite conductivity types to afford connection thereof in the circuit shown thereby to permit use of a common connection comprising conductors 24 and 102 extending through the control system and to afford temperature compensation. In the event the current through transistor T2 increases, for example, due to ambient temperature changes, the voltage drop across rheostat 26 correspondingly increases. This causes the positive bias voltage at emitter E of transistor T1 to become less positive. This decreases the conduction through transistor T1 and the voltage drop across resistor R3. The resultant decrease in the negative bias voltage at emitter E of transistor T2 readjusts the amplified output voltage of the comparator circuit. If the current through transistor T1 increases due to ambient temperature changes, the negative emitter bias voltage of transistor T2 is increased. The voltage drop across rheostat 26 correspondingly increases and the emitter of transistor T1 becomes less positive to effect compensation. As a result, the output of comparator circuit CM is automatically stabilized to a value determined by the reference voltage and the setting of movable arm 26a of rheostat 26 and is regulated by feedback so that it will not vary in response to temperature changes.

The output of the comparator circuit corresponding to the voltage drop across rheostat 26 and resistor R4 is applied to output terminals 14 and 16 and therethrough to input terminals 28 and 30 of cross-over circuit COM.

The input voltage to cross-over circuit COM is applied across the emitter and base electrodes of transistor T3 in a circuit extending through common conductor 24, resistor R7, emitter E and base B and resistor R6 to input terminal 30. This input voltage is also applied through common conductor 24 and resistor R6 across Zener diode ZD1 in the reverse direction. As a result of the positive bias voltage applied to the emitter of transistor T3, the latter is rendered conducting in a circuit extending from common conductor 24 through resistor R7, emitter E and collector C and terminal 32 to negative supply voltage terminal 6 of power supply module PSM. The voltage drop across resistor R7 which corresponds to the output voltage of motor armature reference voltage output portion 42 of the cross-over circuit is applied through conductors 24 and 46 to output terminals 34 and 36 and therethrough and through resistor R12 to input terminals 48 and 50 of power amplifier circuit PAM.

This output voltage of cross-over circuit COM is applied from input terminals 48 and 50 across the emitter and base electrodes of transistor T5 to render the latter conducting. This effects current flow from input terminal 48 through resistor R13, terminals 58 and 60, emitter E and collector C of transistor T5, output terminal 54, control winding CW of magnetic amplifier MA1, output terminal 56 and input terminal 52 to negative terminal 6 of power supply circuit PSM. Rectifier RCT–3 blocks current flow in shunt of winding CW.

As a result of energization of control winding CW, magnetic amplifier MA1 becomes partially conducting and supplies unidirectional output voltage from terminals 62 and 64 thereof across resistor R14 and armature A of motor M. Shunt field winding SF having been energized as hereinbefore described, the output voltage of magnetic amplifier MA1 causes operation of the motor.

The magnitude of the output voltage applied to armature A of the motor may be increased by turning speed setter potentiometer SS clockwise in the direction of the arrow and decreased by turning the same in the opposite direction. This causes corresponding increase or decrease in the motor speed.

When speed setter potentiometer SS is turned in the clockwise direction to accelerate the motor, cross-over circuit COM functions to control increase of the motor armature voltage to its rated value and then functions to maintain full armature voltage and to control motor shunt field weakening to further accelerate the motor. As the reference voltage applied to input terminals 28 and 30 of cross-over circuit CM is increased, the output voltage at terminals 34 and 36 increases until the applied armature voltage reaches rated value and the motor accelerates under armature voltage control with full field excitation. During this time, the voltage at output terminals 38 and 40 of the cross-over circuit remains substantially at zero value. Further increase in the value of speed reference voltage causes Zener diodes ZD1 and ZD2 to respond to effect current flow therethrough in the reverse directions. Diode ZD1 acts as a constant voltage device and maintains the armature reference voltage at output terminals 34 and 36 constant with further increase in speed reference voltage at input terminals 28 and 30. Consequently, the armature voltage of the motor is maintained at the rated value.

When Zener diode ZD2 responds at rated armature voltage, a positive emitter bias voltage is applied to transistor T4 in a circuit extending from common conductor 24 through resistor R2, emitter E and base B of transistor T4, diode ZD2 in the reverse direction and resistor R8 to input terminal 30 to render transistor T4 conducting. This effects current flow from common conductor 24 through resistor R9, emitter E and collector C of transistor T4 and terminal 32 to negative terminal 6 of power supply circuit PSM. The voltage drop across resistor R9 which corresponds to the output voltage of motor field reference voltage output portion 44 of the cross-over circuit is applied through minimum motor field adjusting rheostat MF to output terminals 38 and 40 and therethrough and through resistor R19 and conductor 102 to input terminals 8' and 10' of comparator circuit CM'. A motor field regulating feedback voltage corresponding to the voltage drop across resistor R23 and the left-hand portion of resistor R24 in the shunt field winding circuit is applied through resistor R28 and conductor 104 to input terminals 8' and 10' of comparator circuit CM'. It will be apparent that this feedback voltage is of opposite polarity relative to the field reference voltage derived from cross-over circuit COM and serves to maintain the field excitation constant at the selected value. The reference and feedback voltages are compared and the resultant voltage is amplified and applied from the output terminals of comparator circuit CM' through resistor R20 to input terminals 48' and 50' of power amplifier circuit PAM'. The amplified voltage is applied from output terminals 54' and 56' across control signal windings S of magnetic amplifier MA2. Energization of control signal windings S turns the amplifier toward its "off" condition thereby to weaken the shunt field energization and accelerate the motor under field weakening control.

The maximum voltage obtainable by adjustment of speed setter potentiometer SS is determined and adjusted by setting the movable arm of maximum speed rheostat MS. Turning the movable arm of the latter all the way clockwise in the direction of the arrow shunts the resistance of rheostat MS effectively out of circuit so that the maximum speed reference voltage applicable to comparator circuit CM is substantially equal to the voltage derived from output terminals 2 and 4 of power supply circuit PSM. The minimum motor field energization obtainable by adjustment of speed setter potentiometer SS is determined and adjusted at rheostat MF. Turning the movable arm of rheostat MF clockwise in the direction of the arrow increases the minimum motor field energization and turning the movable arm in the opposite direction decreases the same.

Figure 4:
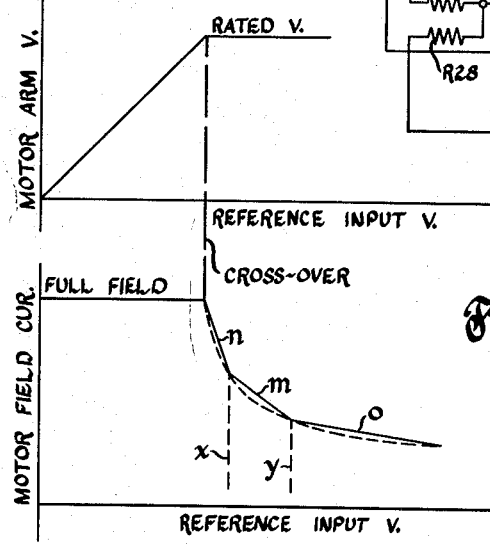
FIG. 4 graphically shows the operating characteristics of a portion of the system of FIG. 1.

FIG. 4 graphically shows the motor armature and shunt field characteristics which are required to afford linear speed adjustment by control of the armature voltage and field energization. As shown in the upper portion of FIG. 4, wherein armature voltage is plotted against reference input voltage, linear speed control requires adustment of the armature voltage linearly to rated value. While the armature voltage is adjusted, the field energization must be maintained constant at full value as shown in the lower portion of FIG. 4, wherein motor field current is plotted against reference input voltage. For further linear acceleration of the motor, the armature voltage must be maintained constant at rated value and the field energization must be decreased non-linearly in accordance with the motor shunt field current speed characteristic curve which is non-linear due to the inherent characteristics of the motor as shown by the broken curve in the lower portion of FIG. 4.

As the motor speed varies non-linearly relative to the field current, it is necessary to adjust the field current non-linearly in order to afford a linear variation in speed relative to the reference input voltage to the cross-over circuit. The known relation of the speed of the motor to the value of field current is such that acceleration in uniform incremental steps requires adjustment of the field current in progressively smaller decremental steps. In order to afford such non-linear adustment of the field current, it is necessary to provide a reference output voltage which increases relative to the reference input voltage beyond the cross-over point as the field current decreases relative to the speed of the motor and vice versa. Such non-linear reference output voltage can then be employed to control the field supply magnetic amplifier and to weaken the field energization to afford a change in motor speed which is proportional to a change in reference input voltage.

As hereinbefore described, the output voltage at terminals 34 and 36 of cross-over circuit COM and, consequently, the motor armature voltage controlled thereby increases linearly in response to increase in the reference input voltage through a first range of magnitude of the latter. When the output voltage at terminals 34 and 36 reaches a predetermined value proportional to the rated armature voltage as shown in the upper portion of FIG. 2, cross-over takes place. That is, further increase in reference input voltage causes the output voltage at terminals 34 and 36 and, consequently, the armature voltage to remain constant at rated value; and an output voltage at terminals 38 and 40 which causes field weakening is initiated. While the output voltage at terminals 34 and 36 is increased, the output voltage at terminals 38 and 40 is maintained substantially at zero value. As a result, the field current controlled thereby is maintained constant at full value as shown by the horizontal portion of the curve in the lower portion of FIG. 4.

When the reference input voltage is increased beyond the cross-over point, the output voltage at terminals 38 and 40 increases at a first relatively rapid rate of change to cause a proportional decrease in the field current in accordance with curve $n$ in the lower portion of FIG. 4 until the reference input voltage reaches value $x$. At this point, Zener diode ZD3 responds to permit current flow in shunt of the emitter and base electrodes of transistor T4. This shunt current is limited by resistor R10 so that further increase in the reference input voltage causes the output voltage at terminals 38 and 40 to increase at a relatively slower rate of change to cause a proportional decrease in the field current in accordance with curve $m$ until the reference input voltage reaches value $y$. Thus, the response of diode ZD3 at point $x$ causes a decrease in the rate of change of output voltage relative to the input voltage.

At point $y$, Zener diode ZD4 responds to establish another conducting circuit in shunt of the emitter and base electrodes of transistor T4. This latter shunt current is limited by resistor R11 so that further increase in reference input voltage causes the output voltage at terminals 38 and 40 to increase at a relatively still slower rate of change to cause a proportional decrease in the field current in accordance with curve $o$. Thus, the response of diode ZD4 at point $y$ causes a further decrease in the rate of change of output voltage relative to the input voltage.

While the output voltage at terminals 38 and 40 has two abrupt alterations in its rate of change relative to the input voltage at points $x$ and $y$, it will be apparent that points $x$ and $y$ and the successive rates of change of the output voltage are selected so that the actual output voltage characteristic very nearly corresponds to or approximates the desired output voltage characteristic. As a result, the actual field weakening characteristic $n$-$m$-$o$ in the lower portion of FIG. 4 very nearly corresponds to or approximates the desired field weakening characteristic shown by the the broken curve. Therefore, it is seen that a linear change in the magnitude of the reference input voltage applied to input terminals 28 and 30 of cross-over circuit COM in the armature control range affords a proportional change in the motor speed. Also, a linear change in the magnitude of the reference input voltage in the field control range affords a linear change in the motor speed in proportion thereto.

To afford the aforementioned linear speed control, portion 44 of the cross-over circuit renders the motor speed proportional to the reference input voltage in the field weakening range of the latter.

Since $$N = \frac{1 + K_1 . I_f}{K_2 . I_f} \text{ or } I_f = \frac{1}{K_2.N - K_1}$$

where N=motor speed; $I_f$=field current; $K_1$=the slope of the saturation curve below full field saturation when field flux is plotted against field current or, in other words, is proportional to the ratio of an increment of field flux to a corresponding increment of field current below the saturation point of field; and $K_2$ is proportional to the maximum field flux.

Then if $V_{in}$ (reference input voltage) is proportional to N and $V_{out}$ (reference output voltage) is proportional to $I_o - I_f$ or equal to $K(I_o - I_f)$ where $I_o$ = full field current; and K is a constant for changing current to voltage;

$$V_{out} = KI_o - \frac{K}{K_2 \cdot N - K_1}$$

And since N is proportional to $V_{in}$, then $$V_{out} = KI_o - \frac{K}{K_2 \cdot V_{in} - K_1}$$

It will be apparent that the latter two empirical equations determine what the output voltage characteristics of portion 44 of the cross-over circuit should be to afford linear speed control of a given shunt motor.

While two Zener diodes ZD3 and ZD4 have been shown for illustrative purposes, it will be apparent that a greater number may be employed if desired to afford field weakening more nearly in accordance with the field speed-current characteristic curve.

Acceleration current limit is provided by current limit circuit CLM. To this end, a voltage proportional to the motor armature current is applied from the opposite ends of resistor R14 to input terminals 66 and 68 of circuit CLM and therethrough across the resistor of current limit adjusting potentiometer 90 and resistor R15 in series. An adjustable portion of this voltage is applied from movable arm 90a of potentiometer 90 through the right-hand portion of the resistor of taper rheostat 92 and movable arm 92a and choke coil 94 across resistor R16. If the motor armature current during acceleration by increasing the applied armature voltage exceeds a predetermined safe value, the voltage across resistor R16 reaches the Zener voltage or, in other words, the value of voltage required to initiate a current avalanche through diode ZD2 in the reverse direction and rectifier RCT-2 to output terminal 70. As a result, a current limit voltage of opposite polarity to the reference voltage derived from the movable arm of potentiometer SS is applied through output terminal 72 and resistor R17 to input terminal 10 of comparator circuit CM. This causes a corresponding decrease in the reference voltage resulting in a decrease in applied armature voltage thereby to decrease the motor armature current to the safe value.

Armature current limiting during acceleration by field weakening is provided by current limit circuit CLM in a similar manner. When speed setter potentiometer SS is operated to weaken the field winding energization, the armature draws a high current from the power supply lines. A signal voltage proportional to such increase in armature current is applied from resistor R14 to current limit circuit CLM and the latter functions as hereinbefore described to apply a positive voltage through resistor R17 to input terminal 10 of comparator circuit CM. This positive voltage is compared with the reference voltage to decrease the output voltage from field reference voltage portion 44 of cross-over circuit COM. The corresponding decrease in energization of control signal windings S drives magnetic amplifier MA2 toward its "on" condition to strengthen the field winding energization and decrease the armature current to a safe value.

Motor speed regulation is afforded by tachometer generator TG having its armature A1 driven through shaft 100 by armature A of the motor. As a result, tachometer generator TG provides an output voltage which is proportional to motor speed. This voltage is applied through resistor R18 to input terminal 10 of comparator circuit CM and compared in the latter with the reference voltage derived from speed setter potentiometer SS. The resultant voltage is applied from comparator circuit CM to cross-over circuit COM and then through power amplifier circuit PAM to control winding CW of magnetic amplifier MA1 which in turn controls the motor armature voltage or through comparator circuit CM' and power amplifier circuit PAM' to control signal windings S of magnetic amplifier MA2 which in turn controls weakening. It will be apparent that this speed regulating voltage generated by tachometer generator TG has opposite polarity relative to the reference voltage derived from potentiometer SS. Thus, a voltage proportional to any variation in motor speed is compared with the reference voltage to regulate the speed of the motor.

It will be apparent that comparator circuit CM has been connected ahead of cross-over circuit COM to afford speed regulation throughout the range of motor speed. When the motor is running in the range of speed from zero to full armature voltage with full field energization, the voltage from tachometer generator TG is applied to the cross-over circuit to control the motor armature voltage thereby to regulate the speed of the motor. Also, when the motor is running in the range of higher speed under field weakening with the armature voltage constant at full value, the voltage from tachometer generator TG is applied to the cross-over circuit to control the field energization thereby to regulate the speed of the motor. More specifically, in the first mentioned speed range, an increase in motor speed causes an increase in tachometer generator voltage to decrease the resultant voltage. This reduces the applied armature voltage to readjust the motor speed to the selected value. In the second mentioned speed range, an increase in motor speed causes an increase in tachometer generator voltage to decrease the resultant voltage. As the resultant voltage normally turns field control magnetic amplifier MA2 toward its "off" condition, such decrease in the resultant voltage turns the magnetic amplifier toward its "on" condition to strengthen the motor field thereby to readjust the motor speed to the selected value.

To stop the motor, speed setter potentiometer SS may be turned all the way counterclockwise to decrease the reference voltage to zero or run relay contacts RR1 are opened. Contracts RR1 disconnect the movable arm of potentiometer SS and thus the adjustable input voltage from input terminal 10 of comparator circuit CM. As a result, control winding CW is deenergized to drive amplifier MA1 to its "off" condition to stop the motor.

Transistor T5 of power amplifier circuit PAM is protected from the inductive effect of control winding CW. It will be apparent that when the motor is accelerated or running, the output current of the power amplifier flows through control winding CW and that rectifier RCT-1 blocks current flow through the shunt circuit. However, when the motor is decelerated or stopped, the shunt circuit provides a low impedance discharge path to prevent damage to or destruction of transistor T5. Thus, current caused to flow by the inductive countervoltage of winding CW in response to collapse of its magnetic field flows through terminal 56, rectifier RCT-1, diode ZD5 and terminal 54. Diode ZD5 is of the Zener type and responds to a countervoltage of predetermined value to effect an avalanche of current flow therethrough to protect transistor T5.

Alternatively, deceleration current limit may be provided by disconnecting the jumper between terminals 70 and 72 and connecting a jumper between terminals 72 and 74 and disconnecting the jumper between terminals 84 and 86 and connecting a jumper between terminals 84 and 88. Now, when the movable arm of speed setter potentiometer SS is turned rapidly counterclockwise to decelerate the motor by field strengthening, the generated armature voltage is increased. This is due to the fact that, for an instant, the speed remains constant and the stronger field causes the motor to generate a higher countervoltage which causes a high value of reverse current to flow.

If deceleration current limit is desired, it will be necessary to connect an armature shunt resistor in known manner because rectifying magnetic amplifier MA1 will not conduct reverse current. If the armature current caused to flow by such countervoltage exceeds a predetermined safe value, deceleration current limit action is initiated. To this end, the voltage drop across resistor R14 which is proportional to the armature current will be of opposite polarity so that a positive voltage will be applied through input terminal 68, conductor 96, output terminal 76 and conductor 98 to common conductor 24 at input terminal 8 of comparator circuit CM and a negative voltage will be applied through input terminal 66, potentiometer 90, rheostat 92, coil 94, terminals 84 and 88, rectifier RCT–3, diode ZD7, output terminals 74 and 72 and resistor R17 to input terminal 10 of comparator circuit CM. This negative current limit signal voltage applied to input terminal 10 is added to the negative reference voltage derived from potentiometer SS and the resultant voltage is amplified and applied to control signal winding S of field supply magnetic amplifier MA2. Thus, the current limit signal voltage weakens the field to prevent rapid increase in the armature countervoltage and maintains the decelerating armature current at a safe value.

Armature current limiting during deceleration by decreasing the applied armature voltage is provided by current limit circuit CLM in a similar manner. When speed setter potentiometer SS is operated to decrease the armature voltage, for an instant, the speed remains constant and the motor generates a countervoltage which exceeds the applied voltage and causes a high value of reverse current to flow. A signal voltage proportional to such increase in armature current is applied from resistor R14 to current limit circuit CLM and the latter functions as hereinbefore described to apply a negative voltage to input terminal 10 of comparator circuit CM. This negative voltage is added to the reference voltage and the resultant voltage is applied to control winding CW of armature supply magnetic amplifier MA1. Thus, the current limit signal voltage prevents rapid decrease in the applied armature voltage and maintains the decelerating armature current at a safe value.

The armature voltage at which current limiting is initiated may be increased by turning movable arm 90a of potentiometer 90 clockwise in the direction of the arrow and decreased by turning the arm in the opposite direction. Rheostat 92 is provided to enable adjustment in the taper in current limiting action, taper being defined as the difference between the maximum value to which the armature current increases at a given time and the lower armature current value at which current limiting is initiated. Turning movable arm 92a of rheostat 92 counterclockwise in the direction of the arrow increases the difference between the aforementioned current values and turning the movable arm in the opposite direction decreases such difference.

While current limit circuit CLM has been illustrated as having accelerating current limit elements ZD6 and RCT–2 decelerating current limit elements ZD7 and RCT–3 alternatively connectable therein by way of external terminals, it will be apparent that two current limit circuits could be connected in parallel, one having elements ZD6 and RCT–2 and the other having elements ZD7 and RCT–3 to provide both accelerating current limit and decelerating current limit if desired.

Figure 2:
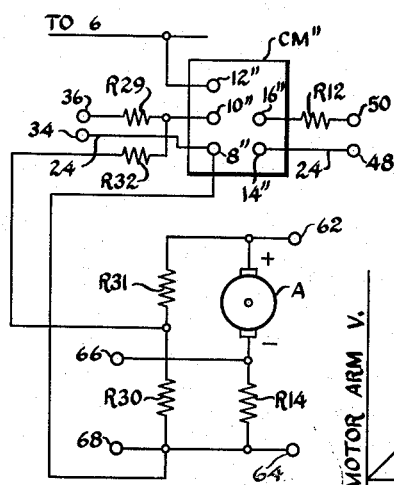
FIG. 2 is a fragmentary diagram of a voltage regulator modification which may be employed in place of the speed regulating tachometer generator of FIG. 1 to afford regulation of the armature voltage.

Referring to FIG. 2, there is shown a circuit whereby the system of FIG. 1 may be modified to afford armature voltage regulation. For this purpose, tachometer generator TG and resistor R18 are disconnected from the system of FIG. 1. As shown in FIG. 2 there is provided a comparator circuit CM″ similar to comparator circuit CM and connected between cross-over circuit COM and power amplifier circuit PAM in the system. To this end, output terminal 36 of the cross-over circuit is connected through a resistor R29 to input terminal 10″. It will be apparent that comparator circuit CM″ has been given reference characters similar to those of circuit CM and distinguished by a double prime. Output terminal 34 of the cross-over circuit is connected directly through common conductor 24 to input terminal 8″ and input terminal 12″ is connected to negative supply terminal 6. Output terminal 16″ is connected through the aforementioned resistor R12 to input terminal 50 and output terminal 14″ is connected directly through common conductor 24 to input terminal 48 of power amplifier circuit PAM.

A voltage divider comprising serially connected resistors R30 and R31 is connected across armature A of the motor and resistor R14. The junction of resistors R30 and R31 is connected through a resistor R32 to input terminal 10″ of comparator circuit CM″ to provide a voltage regulating feedback voltage and the return path for this voltage extends from common conductor 24 at input terminal 8″ to the junction of resistors R30 and R14.

With this modification of the system, a feedback voltage proportional to the supply voltage to the motor armature circuit is applied from the junction of resistors R30 and R31 through resistor R32 to input terminal 10″ of the comparator circuit. It will be apparent that this feedback voltage has opposite polarity to the reference voltage derived from armature reference voltage output portion 42 of the cross-over circuit. Thus, a voltage proportional to any variation in the armature voltage is fed back and compared with the speed reference voltage and the resultant voltage is applied from comparator circuit CM″ through power amplifier circuit PAM to control magnetic amplifier MA1. This effects regulation of the armature voltage to a predetermined value.

Figure 3:
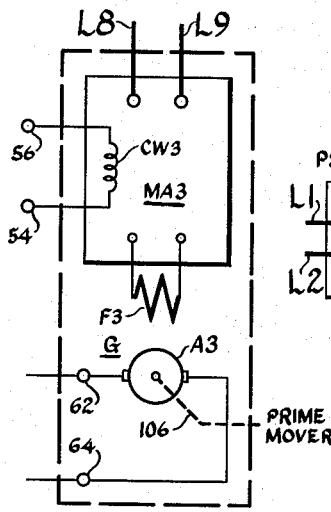
FIG. 3 shows another modification which may be substituted for the magnetic amplifier in the right-hand portion of FIG. 1 to afford an adjustable voltage generator for motor control.

Referring to FIG. 3, there is shown an alternative adjustable voltage motor armature voltage source which may be substituted in place of magnetic amplifier MA1 in FIG. 1. As shown in FIG. 2, a magnetic amplifier MA3 of known type is supplied through lines L8 and L9 from a single-phase alternating current power supply source. Magnetic amplifier MA3 is provided with a control winding CW3 which is energized from output terminals 54 and 56 of power amplifier circuit PAM. The rectified output of magnetic amplifier MA3 is connected across field winding F3 of a direct current generator G. Armature A3 of generator G is mechanically driven through shaft 106 by a prime mover such as an alternating current motor or the like. Armature A3 of the generator is connected to terminals 62 and 64 and therethrough across resistor R14 and armature A of the motor. With these connections, the generator supplies the motor armature voltage and the value thereof may be adjustably controlled by varying the generator field excitation in accordance with the reference voltage hereinbefore described. Either speed regulation as shown in FIG. 1 or armature voltage regulation as shown in FIG. 2 may be employed with the system when modified in accordance with FIG. 3. For deceleration current limit with this modification, the aforementioned motor armature shunt resistor is not required as generator G will receive reverse current from the motor.

It will be apparent that the system hereinbefore described is extremely simple in construction and efficient in operation. The system is constructed of modular component circuits with a minimum of external control elements which may readily be connected to the external terminals provided. Only those elements which may be varied in value depending upon the particular application of the system are connected externally of the modules. The novel modular circuits devised are adapted for potting in plastic material because only long lasting elements are employed therein which do not require replacement over long periods of operational use. The motor speed may be adjusted as desired and the system affords adjustable current limit for acceleration or deceleration to protect the armature winding. Also, linear acceleration and deceleration under field control is afforded as the cross-over circuit provides a field reference voltage which may be varied non-linearly substantially in accordance with the inherent field current speed characteristic curve. The comparator circuit provides automatic temperature compensation and the power amplifier circuit protects its transistor from the inductive load. The system is arranged for speed regulation, the latter being effective also under field weakening speed control. Also, feedback regulation is afforded to maintain constant field excitation at the selected value.

We claim:

1. In an adjustable voltage drive, the combination with a direct current motor having an armature winding and a shunt field winding, of first means for energizing said field winding to full value and controllable to decrease said field winding energization, second means controllable to supply adjustable voltage to said armature winding, means for providing a source of constant but adjustable first control voltage, cross-over means comprising armature voltage control means responsive to said first control voltage through a first range of magnitude thereof for providing a second control voltage for controlling said second means to supply adjustable voltage to said armature winding thereby to effect operation of and acceleration of the motor and field control means responsive to said first control voltage through a second range of magnitude thereof for providing a third control voltage for controlling said first means to decrease the energization of said field winding thereby to further accelerate the motor, means comprising a semi-conductor device responsive to a predetermined value of armature current for providing a fourth control voltage following initiation of change in motor speed whenever the armature current exceeds said predetermined value, and means for comparing said fourth control voltage with said first control voltage to provide a resultant voltage for controlling said cross-over means to maintain the armature current below said predetermined value.

2. In an adjustable voltage drive, the combination with a direct current motor having an armature winding and a shunt field winding, of first means for energizing said field winding to full value and operable to control said field winding energization, second means controllable to supply adjustable voltage to said armature winding, means providing a source of constant but adjustable first voltage, control means responsive to said first voltage for controlling said second means to energize said armature winding and initiate operation of the motor, means responsive to a predetermined value of armature current for providing a second voltage following initiation of change in motor speed whenever the armature current exceeds said predetermined value, said control means comprising comparator means responsive to said first and second voltages for providing a third voltage proportional to the resultant of said first and second voltages, said control means further comprising a cross-over network comprising first semi-conductor control means responsive to a first range of magnitude of said third voltage for controlling said second means to adjust the armature voltage while said field energization is maintained constant at full value, second semi-conductor control means responsive to a higher range of magnitude of said third voltage for controlling said first means to adjust the field winding energization while said armature voltage is maintained constant at full value, and third semi-conductor control means responsive to a predetermined value of said third voltage for effecting a transfer of adjustable output voltage control between said first and said second semi-conductor control means, said second voltage controlling said first semi-conductor control means and the rate of change of said armature voltage in a first speed range to limit the armature current, and said second voltage controlling said second semi-conductor control means and the rate of change of said field energization in a second speed range to limit the armature current.

3. The invention defined in claim 2, together with means responsive to the speed of the motor for providing a fourth voltage proportional to the motor speed, and means for applying said fourth voltage to said comparator means for comparison with said first voltage, said first semi-conductor means being responsive to the resultant output voltage of said comparator means through said first range of magnitude thereof to regulate the armature voltage and the speed of the motor in said first speed range, and said second semi-conductor means being responsive to the resultant output voltage of said comparator means through said second range of magnitude thereof to regulate the field energization and the speed of the motor in said second speed range.

4. In an adjustable voltage drive comprising a direct current motor having a shunt field winding and an armature winding, first power translating means for energizing said field winding to full value and operable to control said field winding energization, second power translating means controllable to apply adjustable voltage to said armature winding, a source of unidirectional reference voltage, speed setter means for deriving a selectively adjustable reference voltage from said reference voltage source, a comparator network operable to compare a plurality of input voltages and to provide an output voltage as a result thereof, one of said input voltages being said adjustable reference voltage, a cross-over network comprising an armature control voltage output portion and a field control voltage output portion, said armature control voltage output portion comprising first semi-conductor means responsive to a first range of magnitude of said adjustable reference voltage for providing a first voltage proportional to the latter, for controlling said second power translating means thereby to control the magnitude of the voltage applied to the armature winding to afford a linear change in motor speed in a first speed range, said field control voltage output portion comprising second semi-conductor means responsive to a second range of magnitude of said adjustable reference voltage for providing a second non-linear voltage for controlling said first power translating means thereby to control the amount of field winding energization in accordance with the inherent field current-speed characteristic to afford a further linear change in motor speed in a second speed range, a current limit network for providing a control voltage proportional to the motor armature current following initiation of change in motor speed whenever the armature current exceeds a predetermined adjustable value, and means for applying said control voltage to said comparator network for comparison with said adjustable reference voltage, the resultant of said control voltage and said reference voltage being applied to said cross-over network to control said first semi-conductor means and limit the armature current to said predetermined value in said first speed range and to control said second semi-conductor means and limit the armature current to said predetermined value in said second speed range.

5. The invention defined in claim 4, together with a speed regulator for providing a feedback voltage proportional to the motor speed, and means for applying said feedback voltage to said comparator network for comparison with said reference voltage and said current limit control voltage, the resultant of the aforementioned compared voltages being applied to said cross-over network to control said first semi-conductor means and regulate the motor speed in said first speed range and to control said second semi-conductor means and regulate the motor speed in said second speed range.

6. The invention defined in claim 4, wherein said cross-over network further comprises third semi-conductor means responsive to increase to a predetermined value of said resultant of said compared voltages for controlling said first and second semi-conductor means for effecting cross-over from said first variable voltage to said second variable voltage, and fourth semi-conductor means responsive to increase of said resultant voltage above said predetermined value for controlling said second semi-conductor means to vary said second voltage non-linearly substantially as a function of the field current-speed characteristic of the motor thereby to afford a linear increase in motor speed under field weakening.

7. The invention defined in claim 6, wherein said current limit network comprises a semi-conductor device responsive to a predetermined value of armature current to provide a current limit control voltage of one polarity in response to motor acceleration control and a second semi-conductor device responsive to a predetermined value of armature current to provide a current limit control voltage of the opposite polarity in response to motor deceleration control, and unidirectional conducting means in circuit with said semi-conductor devices for rendering the same responsive to the respective armature currents.

8. The invention defined in claim 7, together with means for adjusting said current limit network thereby to render said semi-conductor devices responsive to a selected value of armature current, and means for adjusting the current limit taper.

9. In an adjustable voltage control system for a direct current motor having a shunt field winding energized from a controllable source of unidirectional voltage, an armature winding and controllable means for applying adjustable voltage to said armature winding to control the speed of the motor, the improvement comprising an alternating current source, first means for controlling said controllable means to adjust the applied armature voltage, and second means for controlling said controllable source to weaken the field winding energization, said first control means comprising a modular rectifying power supply network, a modular comparator network, a modular cross-over network, a modular power amplifier network and a modular current limit network, said second control means comprising the aforementioned power supply and comparator and cross-over and current limit networks and an additional modular comparator network and modular power amplifier network, each of said networks having external input terminals and external output terminals, the input terminals of said power supply network being connected to said alternating current source, a selectively adjustable speed setter connected between the output terminals of said power supply network and the input terminals of said comparator network for adjusting the rectified reference voltage to the latter, said cross-over network comprising an armature control voltage output circuit and a field control voltage output circuit, said armature control voltage output circuit comprising semi-conductor means responsive to a first range of magnitude of the output voltage of the first mentioned comparator network for controlling the first mentioned power amplifier network and said first means to adjust the armature voltage, said field control voltage output circuit comprising semi-conductor means responsive to a higher range of magnitude of said output voltage for controlling the second mentioned comparator and power amplifier networks and said second means to weaken the field winding energization, means for connecting said current limit network between the motor armature and the input terminals of said first mentioned comparator network, said current limit network comprising semi-conductor means responsive to a predetermined value of armature current for providing a current limit voltage for comparison with said reference voltage to limit the armature current to a predetermined adjustable value, and means for providing a feedback voltage proportional to the motor speed for comparison with said reference voltage to maintain the motor running speed at a predetermined value.

10. In an adjustable voltage drive comprising a direct current motor having a shunt field winding and an armature winding, in combination, first means for energizing said field winding to full value and controllable to weaken the field, second means controllable to supply adjustable voltage to said armature winding, means providing a source of constant but linearly adjustable reference voltage, a cross-over network comprising an armature control circuit and a field control circuit, said armature control circuit comprising means responsive to said reference voltage in a first range of magnitude thereof up to a predetermined value for providing a first output voltage proportional thereto, means responsive to said first output voltage for controlling said second means to control the speed of the motor in a first speed range, said field control circuit comprising semi-conductor control means responsive to said reference voltage in a second range of magnitude thereof above said predetermined value for providing a second output voltage which varies non-linearly substantially in accordance with the equation $$V_{out} = KI_o - \frac{K}{K_2 \cdot V_{in} - K_1}$$

wherein $V_{out}$ is the second output voltage; $V_{in}$ is proportional to the speed reference voltage; $K_1$ is proportional to the ratio of an increment of field flux to a corresponding increment of field current below the saturation point of the field; $K_2$ is proportional to the maximum field flux; $I_o$ is equal to the full field current; and $K$ is a constant for changing current to voltage; means responsive to said second output voltage for controlling said first means to vary the field energization non-linearly substantially in accordance with the inherent shunt field current-speed characteristic thereby to afford a linear adjustment in the motor speed in a second speed range, and current limit means comprising a semi-conductor device responsive to a predetermined value of armature current for providing a feedback voltage for comparison with said reference voltage to afford a resultant voltage for controlling said cross-over network thereby to limit the armature current to a predetermined value.

References Cited in the file of this patent

UNITED STATES PATENTS

| | | |
|---|---|---|
| 2,517,101 | Few | Aug. 1, 1950 |
| 2,546,799 | Thatcher | Mar. 27, 1951 |
| 2,802,977 | Harvey et al. | Aug. 13, 1957 |
| 2,847,632 | Harvey et al. | Aug. 12, 1958 |
| 2,902,634 | Anger | Sept. 1, 1959 |